(12) United States Patent
Liu et al.

(10) Patent No.: US 10,762,376 B2
(45) Date of Patent: Sep. 1, 2020

(54) METHOD AND APPARATUS FOR DETECTING TEXT

(71) Applicant: BAIDU ONLINE NETWORK TECHNOLOGY (BEIJING) CO., LTD., Beijing (CN)

(72) Inventors: Jiaming Liu, Beijing (CN); Chengquan Zhang, Beijing (CN); Junyu Han, Beijing (CN); Errui Ding, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 121 days.

(21) Appl. No.: 16/175,590

(22) Filed: Oct. 30, 2018

(65) Prior Publication Data

US 2019/0272438 A1 Sep. 5, 2019

(30) Foreign Application Priority Data

Jan. 30, 2018 (CN) .......................... 2018 1 0090633

(51) Int. Cl.
*G06K 9/62* (2006.01)
*G06K 9/34* (2006.01)
(Continued)

(52) U.S. Cl.
CPC ........... *G06K 9/344* (2013.01); *G06K 9/2072* (2013.01); *G06K 9/342* (2013.01); *G06K 9/46* (2013.01);
(Continued)

(58) Field of Classification Search
CPC ...... G06K 9/344; G06K 9/342; G06K 9/6276; G06K 9/2072; G06K 2209/01;
(Continued)

(56) References Cited

U.S. PATENT DOCUMENTS 9,245,205 B1 * 1/2016 Soldevila ............. G06K 9/4642
2018/0300564 A1 * 10/2018 Kwant ............... G06K 9/00818
(Continued)

FOREIGN PATENT DOCUMENTS

| CN | 105608456 A | 5/2016 |
|---|---|---|
| CN | 106845475 A | 6/2017 |
| CN | 106846339 A | 6/2017 |

*Primary Examiner* — Samir A Ahmed
(74) *Attorney, Agent, or Firm* — Marshall, Gerstein & Borun LLP

(57) ABSTRACT

A method and apparatus for detecting text are provided. The method includes: extracting features of a to-be-detected image; predicting using a character detection network a probability of each pixel point in the to-be-detected image being a character pixel point, and position information of each pixel point relative to a bounding box of a character including the pixel point when the pixel point is the character pixel point; determining position information of bounding boxes of candidate characters based on the prediction result of the character detection network; inputting the extracted features into a character map network, converting a feature map outputted by the character map network, and generating character vectors; determining a neighboring candidate character of each candidate character, and connecting each candidate character with an associated neighboring candidate character to form a character set; and determining a character area of the to-be-detected image.

17 Claims, 6 Drawing Sheets

(51) Int. Cl.
*G06T 7/70* (2017.01)
*G06K 9/20* (2006.01)
*G06K 9/46* (2006.01)
*G06N 3/04* (2006.01)
*G06N 3/08* (2006.01)

(52) U.S. Cl.
CPC ......... *G06K 9/6217* (2013.01); *G06K 9/6276* (2013.01); *G06N 3/04* (2013.01); *G06N 3/084* (2013.01); *G06T 7/70* (2017.01); *G06K 2209/01* (2013.01); *G06T 2207/20076* (2013.01)

(58) Field of Classification Search
CPC ........ G06N 3/084; G06N 3/04; G06N 3/0454; G06T 2207/20076
See application file for complete search history.

(56) References Cited

U.S. PATENT DOCUMENTS

2018/0322327 A1* 11/2018 Smith ................ G06N 5/046
2019/0012581 A1* 1/2019 Honkala ............. G06K 9/726
2019/0095429 A1* 3/2019 Fan .................... G06N 3/0454

\* cited by examiner

METHOD AND APPARATUS FOR DETECTING TEXT

CROSS-REFERENCE TO RELATED APPLICATIONS

This application claims priority to Chinese Patent Application No. 201810090633.4, filed on Jan. 30, 2018, titled "Method and Apparatus for Detecting Text," which is hereby incorporated by reference in its entirety.

TECHNICAL FIELD

Embodiments of the disclosure relate to the field of computer technology, specifically to the field of image processing technology, and more specifically to a method and apparatus for detecting text.

BACKGROUND

With the development of the computer vision technology, the applications of image-based text detection and text recognition technologies have been increased. For example, the text detection and the text recognition have many practical applications in the aspects, such as document processing, geographical location reading, and image retrieval.

In the field of optical character recognition (OCR), generally, the character box is defined as a rectangular detection box, and characters in a straight line are connected. However, there are a lot of irregular, e.g., distorted, or deformed character combinations in the actually acquired data. For example, the characters in the image are distorted due to the image distortion or shooting angle, or some deformed characters may be used in some designs of the trademarks, badges, or the like.

The existing text detection methods require that the basic connected components in the image are in a straight line, or require pixel-level annotation accuracy, which are not suitable for being widely applied in various scenarios.

SUMMARY

Embodiments of the disclosure provide a method and apparatus for detecting text.

In a first aspect, an embodiment of the disclosure provides a method for detecting text. The method includes: extracting features of a to-be-detected image in a plurality of abstract levels using a feature extraction network of a text detection model; predicting, using a character detection network of the text detection mode based on the extracted features of the to-be-detected image, a probability of each pixel point in the to-be-detected image being a character pixel point, and position information of the each pixel point relative to a bounding box of a character including the pixel point when the each pixel point is the character pixel point; determining position information of bounding boxes of candidate characters, based on the probability of each pixel point being the character pixel point, and the position information of the pixel point relative to the bounding box of the character including the pixel point when the pixel point is the character pixel point; inputting the extracted features of the to-be-detected image into a character mapping network of the text detection model, converting a feature map outputted by the character mapping network based on the position information of the bounding boxes of the candidate characters, and generating character vectors characterizing features of the candidate characters; determining a neighboring candidate character of each candidate character in the to-be-detected image based on the position information of the bounding boxes of the candidate characters, and connecting each candidate character with an associated neighboring candidate character to form a character set based on a degree of difference between each candidate character and the corresponding neighboring candidate character, the degree of difference being calculated using the character vector; and determining a character area of the to-be-detected image based on the position information of the bounding boxes of the candidate characters in the character set.

In some embodiments, the extracting features of a to-be-detected image in a plurality of abstract levels using a feature extraction network of a text detection model includes: inputting the to-be-detected image into the feature extraction network to extract outputs from a plurality of different convolutional layers of the feature extraction network for use as the features in the plurality of abstract levels; and splicing the features in the plurality of abstract levels, or processing the features in the plurality of abstract levels using a feature pyramid network, to generate the features of the to-be-detected image.

In some embodiments, the position information of each pixel point relative to the bounding box of character including the pixel point when the pixel point is the character pixel point includes: offsets of coordinates of each pixel point relative to coordinates of two vertexes on a diagonal line of a rectangular bounding box of the character including the pixel point when the pixel point is the character pixel point.

In some embodiments, the determining position information of bounding boxes of candidate characters based on the probability of the each pixel point being the character pixel point, and the position information of the each pixel point relative to the bounding box of the character including the pixel point when the pixel point is the character pixel point includes: determining pixel points having the probability greater than a preset probability threshold as character pixel points; determining, based on the offsets of the coordinates of each of the determined character pixel points relative to the coordinates of the two vertexes on the diagonal line of the rectangular bounding box of the character including the pixel point, coordinates of bounding boxes of characters positioned by the character pixel points; and filtering out coordinates of a bounding box of a repeatedly positioned character from the coordinates of the bounding boxes of the characters positioned by the character pixel points using a non-maximal value suppression method, to obtain coordinates of the bounding boxes of the candidate characters.

In some embodiments, the determining a neighboring candidate character of each candidate character in the to-be-detected image based on the position information of the bounding box of the candidate character includes: classifying the candidate characters using a k-nearest neighbors algorithm based on the position information of the bounding boxes of the candidate characters, and determining the neighboring candidate character of the candidate character based on a classification result; and the connecting each candidate character with an associated neighboring candidate character to form a character set based on a degree of difference between the candidate character and the corresponding neighboring candidate character calculated using the character vector includes: calculating a Euclidean distance between a character vector of each candidate character and a character vector of each of the corresponding neighboring candidate character for use as the degree of difference between each candidate character and each corresponding neighboring candidate character; and using a neighboring candidate character having the degree of difference between each candidate character and the neighboring candidate character smaller than a preset difference degree threshold as a neighboring candidate character associated with the candidate character, and connecting the candidate character with the associated neighboring candidate character to form the character set.

In some embodiments, the determining a character area of the to-be-detected image based on the position information of the bounding box of each candidate character in the character set includes: drawing a surrounding line surrounding all characters in the character set to from the character area of the to-be-detected image based on the position information of the bounding boxes of the candidate characters in the character set.

In some embodiments, the method further includes: training the text detection model using a machine learning method based on a sample image.

In some embodiments, the training the text detection model using a machine learning method based on a sample image includes: acquiring the sample image including characters marked with bounding boxes; inputting the sample image into the text detection model to predict a character area in the sample image, and to obtain a prediction result on whether a pixel point in the sample image is a character pixel point, a prediction result on position information of a bounding box of a character including the character pixel point in the sample image, and a prediction result on a character set in the sample image; and calculating a value of a preset loss function, calculating a gradient of each parameter in the text detection model relative to the preset loss function, and updating each parameter of the model using a back propagation algorithm, until the value of the preset loss function meets a preset convergence condition. The preset loss function includes a classification loss function, a bounding box regression loss function, and a character connecting loss function. The value of the classification loss function is used for characterizing a difference between a prediction result of the character detection network on whether the pixel point in the sample image is the character pixel point and a marked result on whether the pixel point in the sample image is the character pixel point; the value of the bounding box regression loss function is used for characterizing a difference between a prediction result of the character detection network on the position information of the bounding box of the character including the character pixel point in the sample image and a marked result on the position information of the bounding box of the character including the corresponding character pixel point in the sample image; and the value of the character connecting loss function is used for characterizing a consistency degree of a degree of difference between a prediction result of the text detection model on the character set in the sample image and a character vector of a candidate character in the predicted character set.

In a second aspect, an embodiment of the disclosure provides an apparatus for detecting text. The apparatus includes: an extraction unit for extracting features of a to-be-detected image in a plurality of abstract levels using a feature extraction network of a text detection model; a detection unit for predicting, using a character detection network of the text detection mode based on the extracted features of the to-be-detected image, a probability of each pixel point in the to-be-detected image being a character pixel point, and position information of each pixel point relative to a bounding box of a character including the pixel point when the each pixel point is the character pixel point; a positioning unit for determining position information of bounding boxes of candidate characters based on the probability of each pixel point being the character pixel point, and the position information of each pixel point relative to the bounding box of character including the pixel point when the pixel point is the character pixel point; a mapping unit for inputting the extracted features of the to-be-detected image into a character mapping network of the text detection model, converting a feature map outputted by the character map network based on the position information of the bounding boxes of the candidate characters, and generating character vectors characterizing features of the candidate characters; a connecting unit for determining a neighboring candidate character of the candidate character in the to-be-detected image based on the position information of the bounding boxes of the candidate characters, and connecting each candidate character with an associated neighboring candidate character to form a character set based on a degree of difference between each candidate character and the corresponding neighboring candidate character calculated using the character vector; and a determining unit for determining a character area of the to-be-detected image based on the position information of the bounding boxes of the candidate characters in the character set.

In some embodiments, the extraction unit is used for extracting features of a to-be-detected image in a plurality of abstract levels using a feature extraction network of a text detection model by: inputting the to-be-detected image into the feature extraction network to extract outputs from a plurality of different convolutional layers of the feature extraction network for use as the features in the plurality of abstract levels; and splicing the features in the plurality of abstract levels, or processing the features in the plurality of abstract levels using a feature pyramid network, to generate the features of the to-be-detected image.

In some embodiments, the position information of each pixel point relative to the bounding box of the character including the pixel point when the pixel point is the character pixel point includes: offsets of coordinates of each pixel point relative to coordinates of two vertexes on a diagonal line of a rectangular bounding box of the character including the pixel point when the pixel point is the character pixel point.

In some embodiments, the positioning unit is used for determining position information of bounding boxes of candidate characters based on the probability of each pixel point being the character pixel point, and the position information of each pixel point relative to the bounding box of the character including the pixel point when the pixel point is the character pixel point by: determining pixel points having the probability higher than a preset probability threshold as character pixel points; determining, based on the offsets of the coordinates of each of the determined character pixel points relative to the coordinates of the two vertexes on the diagonal line of the rectangular bounding box of the character including the pixel point, coordinates of bounding boxes of characters positioned by the character pixel points; and filtering out coordinates of a bounding box of a repeatedly positioned character from the coordinates of the bounding boxes of the characters positioned by the character pixel points using a non-maximal value suppression method, to obtain coordinates of the bounding boxes of the candidate characters.

In some embodiments, the connecting unit is used for determining a neighboring candidate character of each candidate character in the to-be-detected image based on the position information of the bounding boxes of the candidate characters by following: classifying the candidate characters using a k-nearest neighbors algorithm based on the position information of the bounding boxes of the candidate characters, and determining the neighboring candidate character of each candidate character based on a classification result; and the connecting unit is used for connecting each candidate character with the associated neighboring candidate characters to form a character set by: calculating a Euclidean distance between a character vector of each candidate character and a character vector of each of the corresponding neighboring candidate character for use as the degree of difference between each candidate character and the corresponding neighboring candidate character; and using a neighboring candidate character having the degree of difference smaller than a preset difference degree threshold as a neighboring candidate character associated with the candidate character, and connecting each candidate character with the associated neighboring candidate character to form the character set.

In some embodiments, the determining unit is used for determining a character area of the to-be-detected image by: drawing a surrounding line surrounding all characters in the character set as the character area of the to-be-detected image based on the position information of the bounding boxes of the candidate characters in the character set.

In some embodiments, the apparatus further includes: a training unit for training the text detection model using a machine learning method based on a sample image.

In some embodiments, the training unit is further used for training the text detection model by: acquiring the sample image including characters marked with bounding boxes; inputting the sample image into the text detection model to predict a character area in the sample image, and to obtain a prediction result on whether a pixel point in the sample image is a character pixel point, a prediction result on position information of a bounding box of a character including the character pixel point in the sample image, and a prediction result on a character set in the sample image; and calculating a value of a preset loss function, calculating a gradient of each parameter in the text detection model relative to the preset loss function, and updating each parameter of the model using a back propagation algorithm, until the value of the preset loss function meets a preset convergence condition. The preset loss function includes a classification loss function, a bounding box regression loss function, and a character connecting loss function. The value of the classification loss function is used for characterizing a difference between a prediction result of the character detection network on whether the pixel point in the sample image is the character pixel point and a marked result on whether the pixel point in the sample image is the character pixel point; the value of the bounding box regression loss function is used for characterizing a difference between a prediction result of the character detection network on the position information of the bounding box of the character including the character pixel point in the sample image and a marked result on the position information of the bounding box of the character including the corresponding character pixel point in the sample image; and the value of the character connecting loss function is used for characterizing a consistency degree of a degree of difference between a prediction result of the text detection model on the character set in the sample image and a character vector of the each candidate character in the predicted character set.

In a third aspect, an embodiment of the disclosure provides a server, including: one or more processors; and a memory for storing one or more programs. The one or more programs, when executed by the one or more processors, cause the one or more processors to implement the method for detecting text according to the first aspect.

In a fourth aspect, an embodiment of the disclosure provides a computer readable storage medium storing a computer program therein. The program, when executed by a processor, causes the method for detecting text according to the first aspect.

The method and apparatus for detecting text according to the above embodiments of the disclosure extract features of a to-be-detected image in a plurality of abstract levels using a feature extraction network of a text detection model, then predict a probability of each pixel point in the to-be-detected image being a character pixel point, and position information of each pixel point relative to a bounding box of a character including the pixel point when the pixel point is the character pixel point using a character detection network of the text detection model based on the extracted features of the to-be-detected image; then determine position information of bounding boxes of candidate characters based on the probability of each pixel point being the character pixel point, and the position information of each pixel point relative to the bounding box of a character including the pixel point when the pixel point is the character pixel point; then input the extracted features of the to-be-detected image into a character mapping network of the text detection model, convert a feature map outputted by the character mapping network based on the position information of the bounding boxes of the candidate characters, and generate character vectors characterizing features of the candidate characters; then determine a neighboring candidate character of each candidate character in the to-be-detected image based on the position information of the bounding boxes of the candidate characters, and connect each candidate character with the associated neighboring candidate character to form a character set based on a degree of difference between each candidate character and the corresponding neighboring candidate character calculated using the character vector; and finally determine a character area of the to-be-detected image based on the position information of the bounding boxes of the candidate characters in the character set, thereby achieving detecting text in a universal scenario, and improving the accuracy in detecting irregular characters.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawing.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
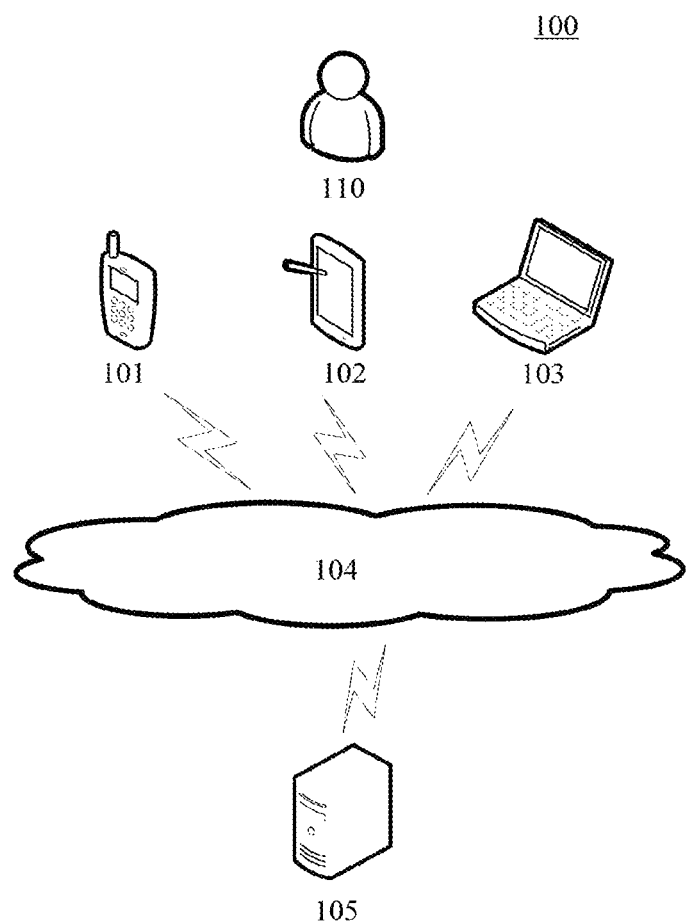
FIG. 1 is an exemplary architecture of a system in which the disclosure may be applied.

FIG. 1 shows an exemplary architecture of a system 100 in which a method for detecting text or an apparatus for detecting text according to the embodiments of the present disclosure.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as document processing applications, search applications, life server applications, and shopping applications may be installed on the terminal devices 101, 102 and 103.

The terminal devices 101, 102, and 103 may be a variety of electronic devices supporting web browsing, including but not limited to smart phones, tablet computers, laptop computers, desktop computers, and the like. In some scenarios, the terminal device 101, 102, or 103 may further have an image acquisition function. For example, the terminal device 101, 102, or 103 may have a camera.

The server 105 may be a server that provides a variety of services, e.g., a background server processing an image processing request sent by the terminal device 101, 102, or 103. The background server may analyze the received image processing request, extract an image feature, identify objects in the image processing, and return the processing results to the terminal devices 101, 102, and 103.

It should be noted that the method for detecting text according to the embodiment of the disclosure may be executed by the server 105. Accordingly, the apparatus for detecting text may be provided in the server 105.

It should be noted that a to-be-detected image may be directly stored in the server 105 locally, and the server 105 may directly extract a local to-be-detected image for detection. In this case, the illustrative system framework 100 may not have the terminal device 101, 102, or 103 or the network 104.

It should be further noted that, the terminal device 101, 102, or 103 may have a processor, image processing applications may be installed in the terminal device 101, 102, or 103, and the terminal device 101, 102, or 103 may detect text in the to-be-detected image based on the image processing applications. In this case, the method for detecting text according to the embodiment of the disclosure may alternatively be executed by the terminal device 101, 102, or 103. Accordingly, the apparatus for detecting text may be provided in the terminal device 101, 102, or 103. In this case, the illustrative system framework 100 may not have the server 105 or the network 104.

It should be understood that the number of the terminal devices, the networks and the servers in FIG. 1 is only illustrative. There may be any number of smart terminal devices, the networks, and the servers based on implementation needs. For example, the server may be a clustered server, including a plurality of servers deployed with different processes.

Figure 2:
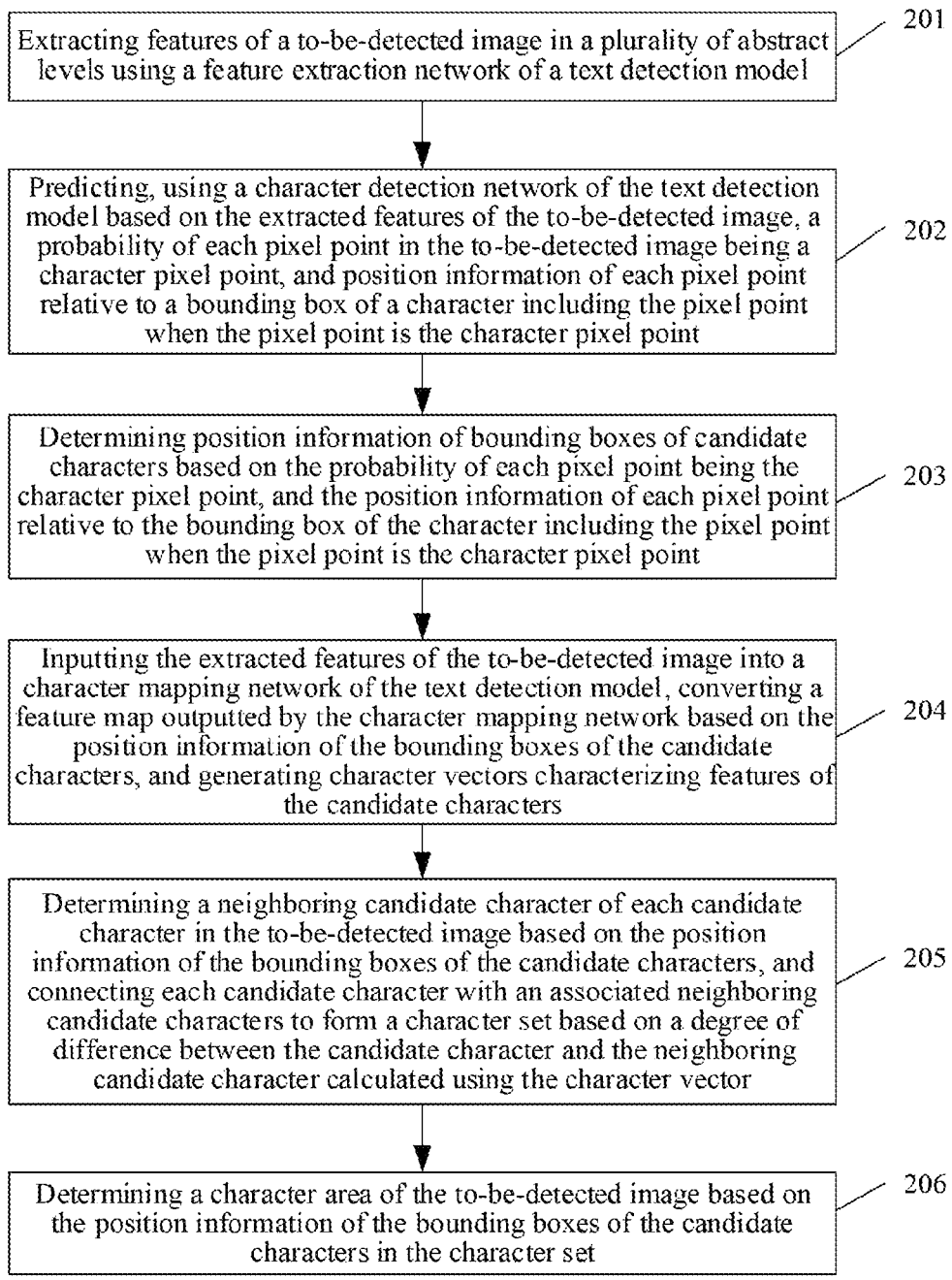
FIG. 2 is a flow chart of an embodiment of a method for detecting text according to the disclosure.

Further reference is made to FIG. 2, which shows a flow 200 of an embodiment of a method for detecting text according to the disclosure. The method for detecting text includes steps 201 to 206.

Step 201: extracting features of a to-be-detected image in a plurality of abstract levels using a feature extraction network of a text detection model.

In the embodiment, an electronic device (e.g., the server 105 shown in FIG. 1) in which the method for detecting text is implemented may first acquire the to-be-detected image. The to-be-detected image may be an image including text characters, e.g., an image including a road sign, a character trademark, or text in a document. The images may be acquired by image acquisition of road signs, trademarks or other markers including text characters in actual scenarios, or generated by format conversion of documents including characters. The electronic device may send a request to a device storing the to-be-detected image, and receive the to-be-detected image sent by the device storing the to-be-detected image in response to the request. Alternatively, the to-be-detected image may be directly stored in the electronic device, and be acquired from a memory when executing text detection.

Then, the electronic device may input the to-be-detected image into a feature extraction network of the text detection model, to extract features of the to-be-detected image. The text detection model may be constructed based on a convolutional neural network, and include a plurality of convolutional layers, a plurality of pooling layers, and fully connected layers. Here, the text detection model may include a feature extraction network, a character detection network, and a character mapping network. The feature extraction network, the character detection network, and the character mapping network each may include a plurality of convolutional layers, pooling layers, and fully connected layers. Each of the convolutional layers may have at least one convolution kernel. Each convolutional layer outputs a feature map by performing a convolution operation on an image inputted into the convolutional layer using the convolution kernel.

Optionally, a deep convolutional neural network framework, such as a VGG convolutional neural network, or a deep ResNet (residual network), may be used as the feature extraction network.

The feature map outputted by each convolutional layer in the feature extraction network is a feature of the to-be-detected image in an abstract level, and the feature maps outputted by different convolutional layers are features of different abstract levels. In the embodiment, the feature maps outputted by a plurality of different convolutional layers may be extracted to form features of abstract levels. Here, the abstract level is an abstract level of the feature. A feature, such as a texture, or a line, of a low abstract level may be extracted from a low-level convolutional layer, and a feature of a high abstract level may be extracted from a high-level convolutional layer. For example, features of eyes, nose, mouth, and the like in a facial image may be extracted from the high-level convolutional layer. The low-level convolutional layer is a convolutional layer close to an input layer of the text detection model, and the high-level convolutional layer is a convolutional layer close to an output layer of the feature extraction network.

In some optional implementations of the embodiment, the features of abstract levels may be extracted from the to-be-detected image as follows. First, the to-be-detected image is input into the feature extraction network, and outputs of different convolutional layers of the feature extraction network are outputted and used as features in the plurality of abstract levels, i.e., the feature maps outputted by the low-level layer, a middle-level layer, and the high-level layer of the feature extraction network may be extracted simultaneously. The features in the plurality of abstract levels may be spliced, or the features in the plurality of abstract levels may be processed using a feature pyramid network (FPN), to generate the features of the to-be-detected image. Specifically, the extracted features in the plurality of abstract levels may be directly spliced, or the extracted features may be integrated using the feature pyramid, to generate features in more abundant abstract levels. The spliced or integrated features may be features of a whole image including features in the plurality of abstract levels. This enables the generated features to integrate features in a low abstract level with small semantic information and specific position features, and features in a high abstract level with abundant semantic information and rough position features, thereby increasing feature dimensions.

Step 202 includes: predicting a probability of each pixel point in the to-be-detected image being a character pixel point, and position information of each pixel point relative to a bounding box of a character including the pixel point when the pixel point is the character pixel point, using a text detection network of the text detection model based on the extracted features of the to-be-detected image.

In the embodiment, a position of a candidate character may be predicted based on the extracted features. Specifically, the extracted features of the to-be-detected image may be inputted into the text detection network of the text detection model, to output feature maps of a plurality of channels. The character detection network may be a fully convolutional network, including a plurality of convolutional layers. The character detection network may predict the probability of each pixel point being the character pixel point, and the position information of each pixel point relative to the character including the pixel point when the pixel point is the character pixel point.

The character pixel point is a pixel point denoting a point on a character. Generally, if the to-be-detected image includes the character, then the character is formed by combining a plurality of character pixel points. The probability of a pixel point being a character pixel point can characterize a possibility degree of the pixel point being the character pixel point. In the embodiment, the probability of each pixel point being a character pixel point may be obtained by convolution operations of a plurality of convolutional layers of the text detection network on the extracted features of the to-be-detected image. Moreover, calculations may be performed by the multiple convolutional layers of the text detection network on the extracted features of the to-be-detected image to calculate the position of the character pixel point. Here, the position information of the character may be defined by position information of the bounding box of the character. The bounding box may be a rectangular bounding box, and may be a smallest circumscribed rectangle of the character in the image. The position information of the bounding box may be expressed by coordinates of four vertexes of the bounding box, or coordinates of two of the vertexes of the bounding box, or a coordinate of one of the vertexes of the bounding box and the height and the width of the bounding box. The position of the character pixel point in the character may be expressed by a distance from the coordinate of the character pixel point to the coordinate of the vertex of the bounding box of the character.

In some optional implementations, the pixel points of the to-be-detected image may be numbered successively based on positions of the pixel points. For example, the pixel point at the top left corner is numbered one, and then the numbers of the pixel points at the vertexes of the bounding box of the character is found out. Based on a one-to-one corresponding relationship between the number and the pixel position, the relative position relationship between each pixel point and the bounding box of the character including the pixel point may be obtained.

In some optional implementations, the position information of each pixel point relative to the bounding box of the character including the pixel point when the pixel point is the character pixel point may include: offsets of coordinates of each pixel point relative to coordinates of two vertexes on a diagonal line of a rectangular bounding box of the character including the pixel point when the pixel point is the character pixel point.

Figure 3:
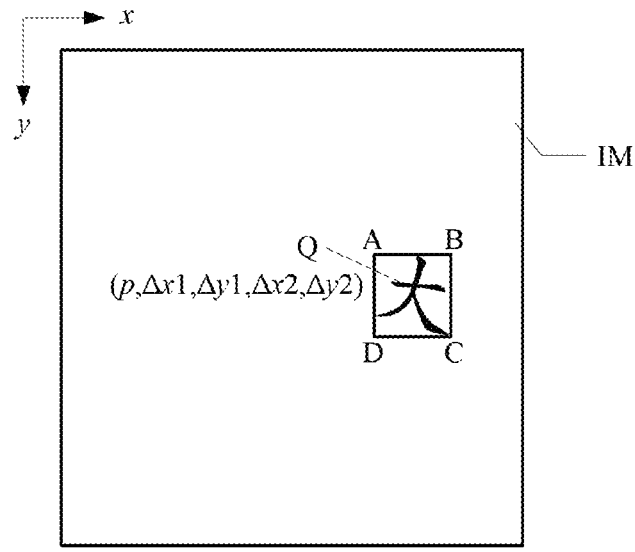
FIG. 3 is a schematic diagram of a detection result of a character detection network of a text detection model.

FIG. 3 shows a schematic diagram of a detection result of a character detection network of a text detection model. As shown in FIG. 3, the detection result of the character detection network on a pixel point Q in a to-be-detected image IM is a quintuple (p, x1, $\Delta$y1, $\Delta$x2, $\Delta$y2), where p is a probability of the pixel point Q being a pixel point of a Chinese character having a meaning "large", $\Delta$x1, and $\Delta$y1 are offsets of coordinates of the pixel point Q relative to a vertex A at the top left corner of a bounding box of the Chinese character including the pixel point Q along an x direction and a y direction, and $\Delta$x2, and $\Delta$y2 are offsets of coordinates of the pixel point Q relative to a vertex C at the bottom right corner of a bounding box of the Chinese character including the pixel point Q along the x direction and the y direction.

As can be seen from FIG. 3, the character detection network can obtain a tuple of each pixel point of the to-be-detected image, thus can output feature maps of a plurality of channels. A feature map of one of the channels is the probability of each pixel point being a character pixel point, and the other channels denote information of relative position between each pixel point and the bounding box of a character including the pixel point when the pixel point is the character pixel point.

Step 203 includes: determining position information of bounding boxes of candidate characters based on the probability of each pixel point being the character pixel point, and the position information of each pixel point relative to the bounding box of the character including the pixel point when the pixel point is the character pixel point.

After determining the information of the relative position between each pixel point in the to-be-detected image and the bounding box of the character including the pixel point when the pixel point is a character pixel point, information for the bounding box around each character may be determined. Then, all pixel points in bounding boxes having identical position information or position information with a difference smaller than a preset difference value may be clustered, and whether probabilities of pixel points in a given cluster being character pixel points meet a preset condition is determined. For example, whether an average value of the probabilities of the pixel points in the given cluster being the character pixel points is greater than a first preset value may be determined, or whether the probabilities of the pixel points in the given cluster being the character pixel points include a probability being greater than a second preset value may be determined. If the preset condition is met, then the character including the pixel points in the given cluster is determined as the candidate character, and the position information of the bounding box around the character including the pixel points in the cluster is the position information of the bounding box of the corresponding candidate character. If the probabilities of the pixel points in the given cluster being the character pixel points fail to meet the preset condition, then the pixel points in the cluster are determined as non-character pixel points.

In some optional implementations of the embodiment, the position information of each pixel point relative to the bounding box of the character including the pixel point when the pixel point is the character pixel point, predicted by the character detection network, includes: offsets of coordinates of each pixel point relative to coordinates of two vertexes on a diagonal line of a rectangular bounding box of the character including the pixel point when the pixel point is the character pixel point. In this case, the determining position information of a bounding box of each candidate character, based on the probability of the pixel point being the character pixel point and the position information of each pixel point relative to the bounding box of the character including the pixel point when the pixel point is the character pixel point may include: first determining that pixel points having the probability higher than a preset probability threshold as the character pixel points; then determining, based on the offsets of the coordinates of each of the determined character pixel points relative to the coordinates of the two vertexes on the diagonal line of the rectangular bounding box of the character including the character pixel point, coordinates of bounding boxes of characters positioned by the character pixel points; and filtering out coordinates of a bounding box of a repeatedly positioned character from the coordinates of the bounding boxes of the characters positioned by the character pixel points using a non-maximal value suppression method, to obtain coordinates of the bounding boxes of candidate characters.

Specifically, in the implementation, pixel points having the probability greater than the preset probability threshold may be screened out and used as the character pixel points based on the prediction result of the character detection network. Then, based on the offsets of the character pixel points relative to the coordinates of the two vertexes on the diagonal line of the bounding box of the character including the character pixel points, and the coordinates of the character pixel points, the coordinates of the two vertexes on the diagonal line of the rectangular bounding box of the character including the character pixel points are calculated. Here, two orthogonal sides of the rectangular bounding box of each character are respectively parallel to two coordinate axes of an image coordinate system of the to-be-detected image. Thus, coordinates of the other two vertexes may be calculated based on the coordinates of the two vertexes on the diagonal line of the bounding box, thus positioning the coordinates of the bounding box.

Each character may include a plurality of character pixel points. Therefore, after determining the coordinates of the bounding boxes of the characters positioned by the character pixel points, it is still necessary to merge positioned bounding boxes at overlapped positions. The plurality of character pixel points corresponding to the merged bounding boxes are a plurality of character pixel points of a given candidate character. The repeatedly positioned bounding boxes may be filtered out using the non-maximal value suppression method, specifically the bounding boxes are arranged in a descending order of probabilities of characters of the bounding boxes (probabilities of the pixel points in the positioned bounding boxes being the character pixel points), a first bounding box is determined as a bounding box of a first candidate character, then whether an overlapping area between a current bounding box and a previous bounding box is greater than a preset area is determined in the order, the current bounding box is filtered out if the overlapping area is greater than the preset area, and otherwise the current bounding box is determined as a bounding box of a new candidate character. Thus, the coordinates of the repeatedly positioned bounding boxes of the characters can be filtered out by searching a maximum value and filtering out non-maximal values, and the bounding boxes obtained by the filtering operation are bounding boxes of the candidate characters, thus obtaining the coordinates of the bounding boxes of the candidate characters.

Figure 4:
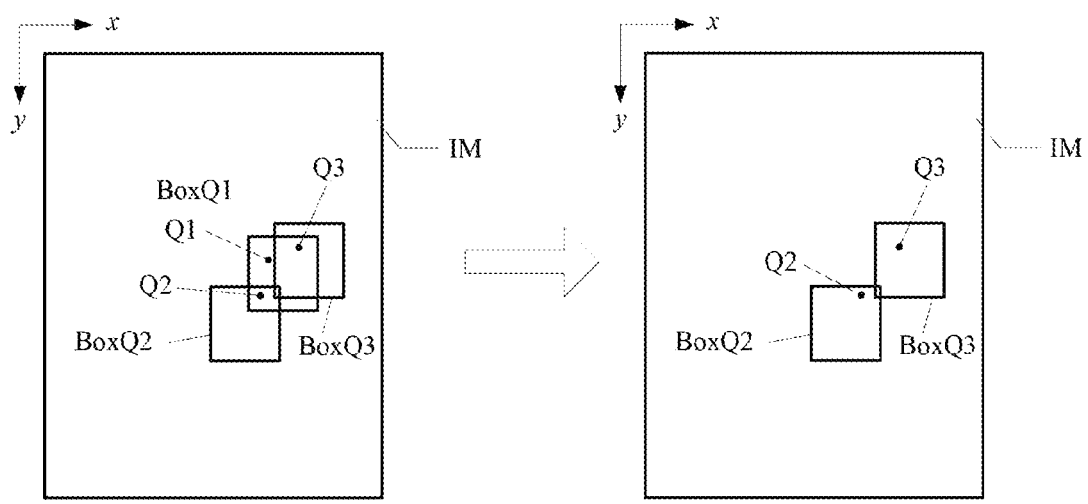
FIG. 4 is a schematic diagram of determining position information of bounding boxes of candidate characters by a text detection model.

Reference is made to FIG. 4, which shows a schematic diagram of an optional implementation of determining position information of bounding boxes of candidate characters by a text detection model. As shown in FIG. 4, in the to-be-detected image IM, a bounding box of a character positioned by a character pixel point Q1 is BoxQ1, a bounding box of a character positioned by a character pixel point Q2 is BoxQ2, and a bounding box of a character positioned by a character pixel point Q3 is BoxQ3. An overlapping area between the bounding boxes BoxQ1 and BoxQ3 is more than a half of an area of the bounding box BoxQ1, and is more than a half of an area of the bounding box BoxQ3. An overlapping area between the bounding boxes BoxQ1 and BoxQ2 is less than or equal to a half of the area of the bounding box BoxQ1, and is less than or equal to a half of an area of the bounding box BoxQ2. Then the BoxQ1 and the BoxQ3 may be classified into a category, and the BoxQ2 may be classified into another category. A probability of the pixel point Q1 positioning the bounding box BoxQ1 being a character pixel point and a probability of the pixel point Q3 positioning the bounding box BoxQ3 being a character pixel point may be further compared to filter out the bounding box Q1 having a smaller probability, and then the bounding boxes BoxQ2 and BoxQ3 of two candidate characters are obtained respectively.

Step 204 includes: inputting the extracted features of the to-be-detected image into a character mapping network of the text detection model, converting a feature map outputted by the character mapping network based on the position information of the bounding boxes of the candidate characters, and generating character vectors characterizing features of the candidate characters.

In the embodiment, the features extracted in the step 201 maybe mapped to a high-dimensional space by the character mapping network of the text detection model. The character mapping network may include a plurality of convolutional layers. A feature map including multi-dimensional features is obtained by calculations on features of the to-be-detected image through the plurality of convolutional layers of the character mapping network. Here, the output of the character mapping network may be, e.g., 128 feature maps, and then the character mapping network maps the features of the to-be-detected image to a 128-dimensional feature space.

Then the areas indicated by the position information of the bounding boxes of the candidate characters may be used as regions of interest (ROI). The ROI may be mapped to the feature map outputted by the character mapping network, the ROI in the feature map outputted by the character map network is pooled, and the pooling operation results are classified by the fully connected layer to obtain a vector corresponding to each ROI, i.e., the character vector of the candidate character corresponding to each ROI.

Step 205 includes: determining a neighboring candidate character of each candidate character in the to-be-detected image based on the position information of the bounding boxes of the candidate characters, and connecting each candidate character with an associated neighboring candidate character to form a character set based on a degree of difference between each candidate character and the neighboring candidate character calculated using the character vector.

After determining the positions of the bounding boxes of the candidate characters and the character vectors of the candidate characters, the character area formed by connecting areas of the plurality of candidate characters may be predicted. Specifically, a distance between the character candidates may be calculated based on the position information of the bounding boxes of the candidate characters, and a distance threshold between adjacent candidate characters may be determined according to a statistic result of all distances. Then, each candidate character is used as a target candidate character, and a candidate character having a distance to the target candidate character smaller than the distance threshold is determined as the neighboring candidate character of the target candidate character. Thus, the neighboring candidate character of each candidate character can be found. Optionally, when calculating the distance between the candidate characters, one of the vertexes of the bounding box (e.g., the top left corner) may be selected to calculate the distance between the selected vertexes of the bounding boxes of the adjacent candidate characters, or center positions of the candidate characters may be determined based on the positions of the bounding boxes of the candidate characters to calculate the distance between the center positions of the candidate characters.

Then, the degree of difference between each candidate character and the neighboring candidate character may be calculated based on character vectors of the candidate characters, and the neighboring candidate character associated with the candidate character may be determined based on the degree of difference. Specifically, a neighboring candidate character having the degree of difference smaller than a preset difference degree threshold may be used as the neighboring candidate character associated with the candidate character. Finally, the candidate character is connected with the associated neighboring candidate character to form the character set.

Generally, characters in a given character area of an image have a small difference degree in the aspects, such as a rotation angle, a distortion degree, and a font type. In the embodiment, a degree of difference between each candidate character and the neighboring candidate character is quantified by extracting character vectors and calculating the degree of difference between the character vectors, and candidate characters having similar rotation angles, distortion degrees, font types, and the like may be effectively extracted, to predict a character area formed by connecting the areas of the plurality of candidate characters.

In some optional implementations of the embodiment, the determining a neighboring candidate character of each candidate character in the to-be-detected image based on the position information of the bounding boxes of the candidate characters may be executed by: classifying the candidate characters using a k-nearest neighbors algorithm based on the position information of the bounding boxes of the candidate characters, and determining the neighboring candidate character of each candidate character based on a classification result. Here, K may be a positive integer, or a value set based on experience, or a value obtained by training the k-nearest neighbor classifier based on marked sample data. In the obtained classification result, candidate characters in a given category are neighboring candidate characters to each other. Thus, the neighboring candidate character of each candidate character may be determined.

Furthermore, the connecting each candidate character with the associated neighboring candidate character to form a character set based on a degree of difference between each candidate character and the corresponding neighboring candidate character calculated using the character vector may be executed by: calculating a Euclidean distance between the character vector of each candidate character and the character vector of each of the corresponding neighboring candidate characters, using the Euclidean distance as the degree of difference between each candidate character and the corresponding neighboring candidate character; and using a neighboring candidate character having the degree of difference smaller than a preset difference degree threshold as a neighboring candidate character associated with the candidate character, and connecting the candidate character with the associated neighboring candidate character to form the character set. That is, the Euclidean distance between the character vectors may be used as a measure of the degree of difference between the candidate character and the neighboring candidate character. If the Euclidean distance is smaller than a set Euclidean distance threshold, then the corresponding two candidate characters may be determined as associated candidate characters, and the candidate character may be connected with the associated neighboring candidate character to form the character set. Here, the preset difference degree threshold may be the set Euclidean distance threshold.

It should be noted that in other optional implementations of the embodiment, the degree of difference between the candidate character and the neighboring candidate character may alternatively be calculated using other difference degree calculation method using the character vectors of the candidate character and the neighboring candidate character. For example, a reciprocal of a measurement parameter of a cosine similarity degree, or a Pearson correlation coefficient similarity may be calculated for use as the difference degree, which is not described in detail herein.

Step 206 includes: determining a character area of the to-be-detected image based on the position information of the bounding boxes of the candidate characters in the character set.

Finally, the bounding boxes of the candidate characters in the character set may be connected, to form the bounding box around the whole character set. The bounding box is the character area corresponding to the character set. If a plurality of character sets is detected in the step 205, then a plurality of character areas may be formed in the step 206.

Optionally, the plurality of character areas may further be connected to form a character area finally obtained by detection.

In some optional implementations of the embodiment, the character area of the to-be-detected image is determined by: drawing a surrounding line surrounding all characters in the character set to form the character area of the to-be-detected image based on the position information of the bounding boxes of the candidate characters in the character set.

The surrounding line may be formed by connecting vertexes of the bounding boxes of the candidate characters in the character set. Therefore, positions of connection points on the surrounding line may be determined based on the position information of the bounding boxes of the candidate characters of the character set, and then the area surrounded by the surrounding line is determined as the character area.

Figure 5:
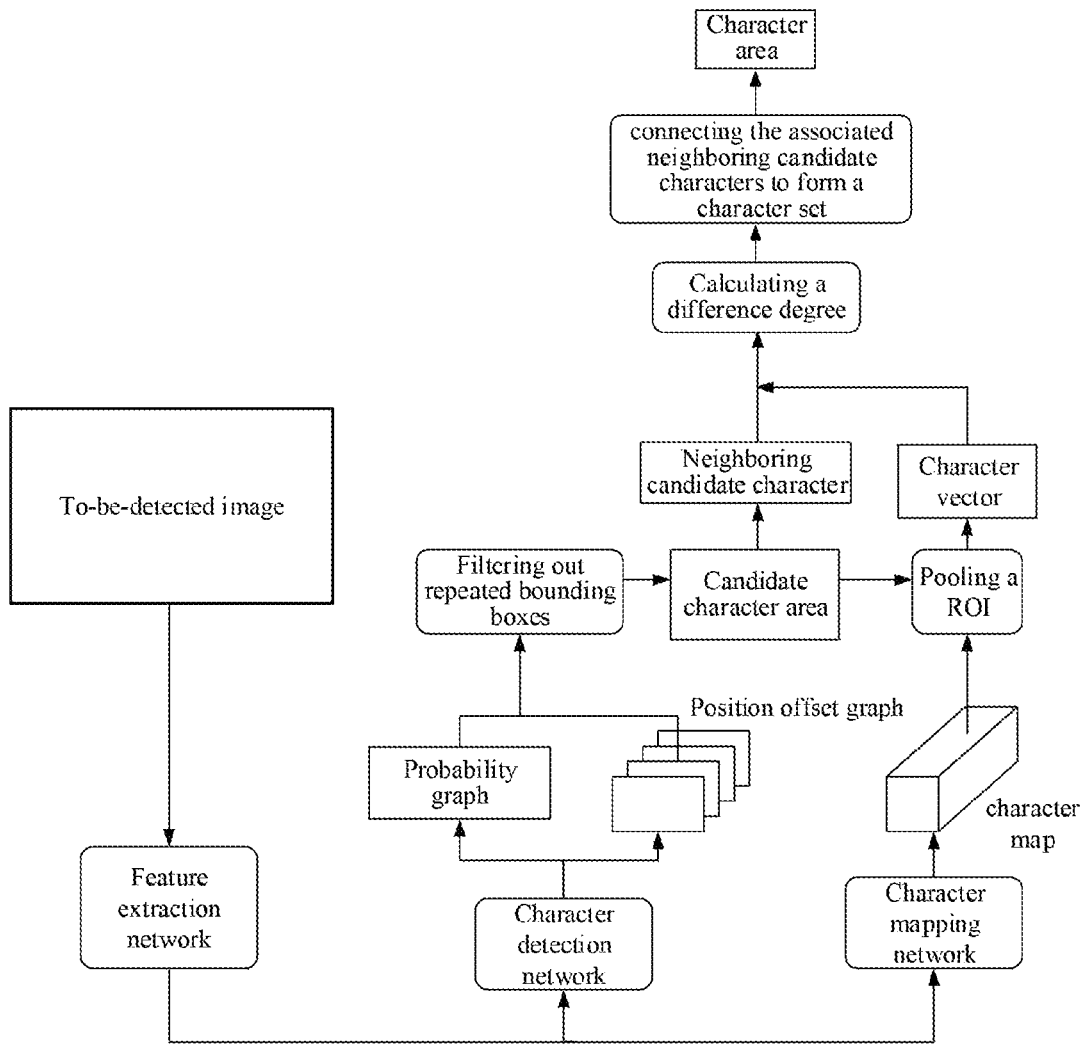
FIG. 5 is a schematic diagram of an implementation of a flow of a method for detecting text according to the disclosure.

FIG. 5 shows a schematic diagram of an implementation of a flow of a method for detecting text according to the disclosure. As shown in FIG. 5, the to-be-detected image is first inputted into a feature extraction network to extract features in a plurality of abstract levels, and then the extracted features are inputted into a character detection network to output feature maps of five channels. One of the channels is a probability graph denoting a probability of each pixel point being a character pixel point, and the other four channels are position offset graphs denoting offsets of each pixel point relative to coordinates of respective vertexes at the top left corner and at the bottom right corner of the bounding box of the character including the pixel point. Then, repeated bounding boxes may be filtered out (i.e., filtering out repeatedly positioned characters) based on the probability graph and the position offset graphs, to obtain candidate character areas.

The features extracted from the feature extraction network are inputted into a character mapping network to obtain a high-dimensional character map, and then a character vector of each candidate character is obtained by pooling the candidate character areas used as a ROI in the character map. Then neighboring candidate characters of candidate characters are screened out based on the candidate character areas, and degrees of differences between the candidate character and the character vectors of the neighboring candidate characters are calculated to determine the associated neighboring candidate characters. Finally, the associated neighboring candidate characters are connected to form a character set, and a surrounding line surrounding the character set is calculated to obtain a character area.

The method for detecting text according to the above embodiments of the disclosure extracts features of a to-be-detected image in a plurality of abstract levels using a feature extraction network of a text detection model, then predicts, using a character detection network of the text detection model based on the extracted features of the to-be-detected image, a probability of each pixel point in the to-be-detected image being a character pixel point, and position information of each pixel point relative to a bounding box of a character including the pixel point when the pixel point is the character pixel point; then determines position information of a bounding box of each candidate character based on the probability of each pixel point being the character pixel point, and the position information of each pixel point relative to the bounding box of the character including the pixel point when the pixel point is the character pixel point; then inputs the extracted features of the to-be-detected image into a character mapping network of the text detection model, converts a feature map outputted by the character map network based on the position information of the bounding boxes of the candidate characters, and generates character vectors characterizing features of the candidate characters; then determines neighboring candidate characters of each candidate character in the to-be-detected image based on the position information of the bounding boxes of candidate characters, and connects each candidate character with associated neighboring candidate characters to form a character set based on a degree of difference between the candidate character and the corresponding neighboring candidate characters calculated using the character vector; and finally determines a character area of the to-be-detected image based on the position information of the bounding boxes of the candidate characters in the character set, thereby achieving detecting text in a universal scenario, and improving the accuracy in detecting irregular characters.

In some embodiments, the method for detecting text may further include training the text detection model using a machine learning method based on a sample image. The text detection model may include a feature extraction network, a character detection network, and a character mapping network. The feature extraction network, the character detection network, and the character mapping network may be convolutional neural networks having different structures and parameters. The sample image may be used as an input of the text detection model to continuously adjust parameters of the text detection model, enabling a character area predicted by the text detection model to approach the actual character area.

In some optional implementations, a sample image having high annotation accuracy may be used for training.

Figure 6:
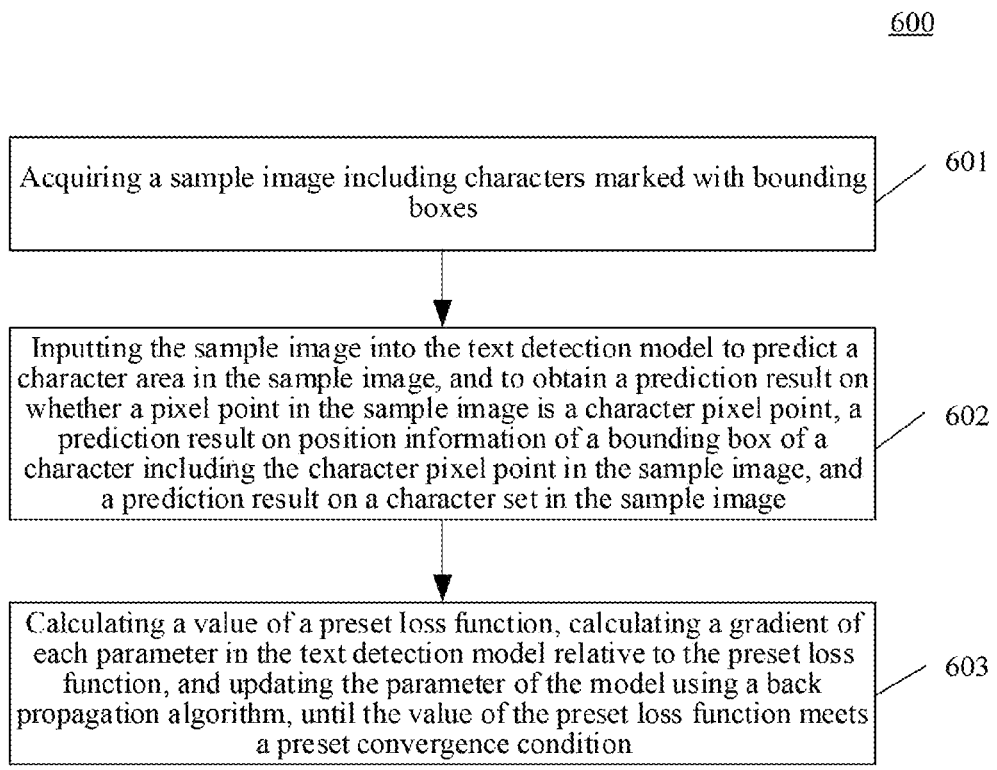
FIG. 6 is a flow chart of a specific implementation of training a text detection model in a method for detecting text according to the disclosure.

Reference is made to FIG. 6, which shows a flowchart of a specific implementation of training a text detection model in a method for detecting text according to the disclosure. As shown in FIG. 6, the flow 600 of training the text detection model may include steps 601 to 603.

Step 601 includes: acquiring a sample image having characters marked with bounding boxes.

In the embodiment, a sample image having a character-level annotation may be acquired. Each character and a character set included in the sample image are marked with the bounding boxes. Here, the character set is a set of characters having close distances or semantic association.

Specifically, the sample image may be a randomly acquired image including or excluding text characters. When acquiring sample images, accurately marked sample images may be selected to form a positive sample set, and sample images having incorrect marks or marks with deviations may be used as a negative sample set. Here, the incorrect marks may include marking a non-character as a character, and/or marking a character as a non-character, etc., and the marks with deviations may include a deviation between a bounding box of the marked character and an actual position of the character. Optionally, the ratio of the number of the positive sample to the number of the negative sample may be set as 1:3, to ensure the training accuracy.

Step 602 includes: inputting the sample image into the text detection model to predict a character area in the sample image, and to obtain a result of predicting whether a pixel point in the sample image is a character pixel point, a result of predicting position information of a bounding box of a character including the character pixel point in the sample image, and a result of predicting a character set in the sample image.

The sample image may be inputted into the text detection model for prediction, and a prediction result for dividing pixel points into a category of "character pixel points" and a category of "non-character pixel points" based on a probability of each pixel point outputted by the character detection network and by processing through a feature extraction network and a character detection network, may be extracted, i.e., obtaining the result of predicting whether the pixel point in the sample image is the character pixel point. A prediction result for position information of a bounding box of a candidate character calculated by processing through the feature extraction network and the character detection network, and based on the position information of each pixel point relative to a bounding box of the character including the pixel point when the pixel point is a character pixel point, may be extracted, i.e., obtaining the result of predicting the position information of the bounding box of the character including the character pixel point in the sample image. A prediction result for the character set in the sample image obtained by processing through the feature extraction network, the character detection network, and a character mapping network, and based on the position information of the bounding box of the candidate character and a character vector outputted by the character mapping network, may also be extracted.

Step 603 includes: calculating a value of a preset loss function, calculating a gradient of each parameter in the text detection model relative to the preset loss function, and updating the parameter of the model using a back propagation algorithm, until the value of the preset loss function meets a preset convergence condition.

Here, the preset loss function includes a classification loss function, a bounding box regression loss function, and a character connecting loss function. The value of the classification loss function is used for characterizing a difference between a prediction result of the character detection network on whether the pixel point in the sample image is the character pixel point and a marked result on whether the pixel point in the sample image is the character pixel point. The value of the bounding box regression loss function is used for characterizing a difference between a prediction result of the character detection network on the position information of the bounding box of the character including the character pixel point in the sample image and a marked result on the position information of the bounding box of the character including the corresponding character pixel point in the sample image. The value of the character connecting loss function is used for characterizing a consistency degree of degrees of differences between a prediction result of the text detection model on the character set in the sample image and character vectors of candidate characters in the predicted character set.

The classification loss function is used for characterizing a deviation in classifying the pixel points by the character detection network based on the probability of each pixel point in the to-be-detected image being the character pixel point. The bounding box loss function is used for characterizing a deviation between the calculated position information of each character and the actual position information of the character, and the calculated position information is calculated based on the position information of the character pixel point relative to a bounding box of the character including the character pixel point and outputted by the character detection network. The character connecting loss function is used for characterizing a deviation of the prediction result of the text detection model on the character set after detecting the position of the bounding box of the candidate character, calculating the character vector of the candidate character, and screening out associated neighboring candidate characters.

The preset loss function L used in the process of training the text detection model may be:

$$L = L_{class} + \lambda_1 L_{reg} + \lambda_2 L_{emb} \quad (1)$$

The Lclass is a classification loss function, the Lreg is a bounding box regression loss function, and the Lemb is a character connecting loss function. A max margin objective function may be used for the Lclass, and an Intersection-over-Union Loss (IoU loss) function may be used for the Lreg. The calculation may be as follows:

$$L_{emb} = \sqrt{J(v_i, v_j, l_{i,j})} \quad (2)$$

$$J(v_i, v_j, l_{i,j}) = l_{i,j}[D(v_i, v_j)]^2 + (1 - l_{i,j})\{[\alpha - D(v_i, v_j)]_+\}^2 \quad (3)$$

$\lambda 1$ and $\lambda 2$ are preset coefficients, $\overline{J(v_i, v_j, l_{i,j})}$ denotes an average value of $J(v_i, v_j, l_{i,j})$, $v_i$ and $v_j$ are character vectors of two characters i and j, and $l_{i,j}$ is a positive or negative attribute of connection between the two characters i and j. If the two characters i and j are connected to form a given character set, then $i_{i,j} = 1$, and otherwise $l_{i,j} = 0$. D is a Euclidean distance calculation symbol, $\alpha$ is a preset value, denotes a boundary value of a negative connection, and $[\alpha - D(v_i, v_j)]_+$ denotes a maximum value of 0 and $\alpha - D(v_i, v_j)$.

The value of the classification loss function Lclass may be calculated based on a difference between the prediction result on whether the pixel point in the sample image is the character pixel point obtained in the step 602 and a marked result on whether the pixel point in the sample image is the character pixel point. The value of the bounding box regression loss function Lreg may be calculated based on the prediction result on the position information of the bounding box of the character including the character pixel point in the sample image obtained in the step 602 and the prediction result on the character set in the sample image. The value of the character connecting loss function may be obtained based on a prediction result on a connecting attribute of the character set obtained in the step 602 and a Euclidean distance between the character vectors of the candidate characters in the character set, and then the value of the preset loss letter L is obtained.

Whether the value of the preset loss function L meets a preset convergence condition, such as whether the value of the preset loss function converges to a minimum value, or whether the value of the preset loss function achieves a preset convergence value, may be determined. If the value of the preset loss function fails to meet the preset convergence condition, a gradient of each parameter in the text detection model relative to the preset loss function may be calculated, the parameter may be updated using a gradient descent method, and the prediction result may be re-acquired using the text detection model of the updated parameters, to calculate the value of the preset loss function, and then determine whether the value of the preset loss function meets the preset convergence condition. The updating the parameters and the re-predicting using the text detection model with updated parameters maybe repeatedly executed. The value of the preset loss function is calculated, and whether the value of the preset loss function meets the preset convergence condition is determined, until the value of the preset loss function meets the preset convergence condition. The updating the parameters is stopped, and the current parameters of the text detection model are determined as the parameters of the trained character model.

In some other optional implementations of the embodiment, the text detection model may be trained using a weak supervision method. For example, first text boxes may be detected, and then some of the text boxes may be selected and marked. For example, individual characters in some entries may be marked. An individual character detector is trained using the marked entries, then characters in the sample image may be detected using the trained individual character detector to obtain the sample image having marked characters, and then the training the text detection model may be completed using the steps 602 and 603.

The method for training the text detection model constantly adjusts parameters of the model, to enable the loss function calculated based on the prediction results to be gradually reduced, thereby enabling the text detection model to effectively learn the logic of the character mark, and to obtain accurate detection results. At the same time, the text detection model does not excessively limit a connection between characters, enabling the text detection model to be suitable for character detection in a universal scenario, such as distortion, and rotation.

Figure 7:
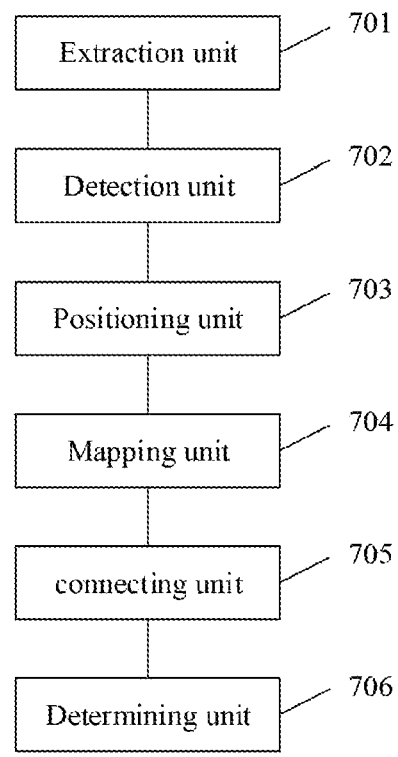
FIG. 7 is a schematic structural diagram of an apparatus for detecting text according to an embodiment of the disclosure.

Further reference is made to FIG. 7. As an implementation of the method shown in the above figures, the disclosure provides an embodiment of an apparatus for detecting text. The embodiment of the apparatus corresponds to the embodiment of the method shown in FIG. 2. The apparatus may be specifically applied to a variety of electronic devices.

As shown in FIG. 7, an apparatus 700 for detecting text according to the embodiment includes: an extraction unit 701, a detection unit 702, a positioning unit 703, a mapping unit 704, a connecting unit 705 and a determining unit 706. The extraction unit 701 may be configured for extracting features of a to-be-detected image in a plurality of abstract levels using a feature extraction network of a text detection model; the detection unit 702 may be configured for predicting, using a character detection network of the text detection model, a probability of each pixel point in the to-be-detected image being a character pixel point, and position information of each pixel point relative to a bounding box of a character including the pixel point when the pixel point is the character pixel point based on the extracted features of the to-be-detected image; the positioning unit 703 may be configured for determining position information of a bounding box of each candidate character based on the probability of each pixel point being the character pixel point, and the position information of each pixel point relative to the bounding box of the character including the pixel point when the pixel point is the character pixel point; the mapping unit 704 may be configured for inputting the extracted features of the to-be-detected image into a character mapping network of the text detection model, converting a feature map outputted by the character mapping network based on the position information of the bounding boxes of the candidate characters, and generating character vectors characterizing features of the candidate characters; the connecting unit 705 may be configured for determining a neighboring candidate character of each candidate character in the to-be-detected image based on the position information of the bounding boxes of the candidate characters, and connecting each candidate character with the associated neighboring candidate character to form a character set based on a degree of difference between the candidate character and the corresponding neighboring candidate character calculated using the character vector; and the determining unit 706 may be configured for determining a character area of the to-be-detected image based on the position information of the bounding boxes of the candidate characters in the character set.

In the embodiment, the extraction unit 701 may first acquire the to-be-detected image, and then input the to-be-detected image into the feature extraction network of the text detection model, to extract features of the to-be-detected image. The text detection model may be constructed based on a convolutional neural network, including a plurality of convolutional layers, and a plurality of pooling layers. The feature map outputted by each convolutional layer in the feature extraction network is a feature of the to-be-detected image in an abstract level, and the feature maps outputted by different convolutional layers are features in different abstract levels. In the embodiment, the extraction unit 701 may extract feature maps outputted by a plurality of different convolutional layers, to form features in a plurality of abstract levels.

The detection unit 702 may predict a position of a candidate character based on the features extracted by the extraction unit 701. Specifically, the extracted features of the to-be-detected image may be inputted into the character detection network to output feature maps of a plurality of channels. One of the channels is a probability graph, denoting the probability of each pixel point in the to-be-detected image being a character pixel point; and the other channels are position offset graphs, denoting information of relative position between each pixel point and the bounding box of a character including the pixel point when the pixel point is the character pixel point.

After the detection unit 702 obtains the information of the relative position between each pixel point and the bounding box of the character including the pixel point when the pixel point is the character pixel point, the positioning unit 703 may determine information of the bounding box around each character. Then, the positioning unit may cluster all pixel points having identical position information of the bounding boxes or position information having a difference smaller than a preset difference value, and determine whether probabilities of pixel points in a given cluster being character pixel points meet a preset condition. If the probabilities of the pixel points in the given cluster being the character pixel points meet the preset condition, then characters of the pixel points in the cluster may be determined as the candidate characters, and the position information of the bounding boxes of the characters including the pixel points in the cluster is the position information of the bounding boxes of the corresponding candidate characters.

The mapping unit 704 may map the features extracted by the extraction unit 701 to a high-dimensional space using the character mapping network of the text detection model, then use the area indicated by the position information of the bounding box of each candidate character as a region of interest (ROI), map the ROI to a feature map outputted by the character map network, pool the ROI in the feature map outputted by the character mapping network, and classify the pooling operation results by the fully connected layer to obtain a vector corresponding to each ROI, i.e., the character vector of the candidate character corresponding each ROI.

The connecting unit 705 may calculate a distance between the candidate characters based on the position information of the bounding boxes of the candidate characters, to determine a neighboring candidate character of each candidate character, then calculate a degree of difference between the candidate character and the neighboring candidate character based on character vectors of the candidate character and the neighboring candidate character, and determine two candidate characters having the degree of difference smaller than a preset difference degree threshold as the associated candidate characters. Then the associated candidate characters of each candidate character may be connected to form a character set.

The determining unit 706 may connect the bounding boxes of the candidate characters in the character set, to form the bounding box surrounding the whole character set. The bounding box surrounding the whole character set is the character area corresponding to the character set.

In some embodiments, the extraction unit 701 may be configured for extracting features of the to-be-detected image in a plurality of abstract levels using the feature extraction network of the text detection model by: inputting the to-be-detected image into the feature extraction network to extract outputs from a plurality of different convolutional layers of the feature extraction network for use as the features in the plurality of abstract levels; and splicing the features in the plurality of abstract levels, or processing the features in the plurality of abstract levels using a feature pyramid network, to generate the features of the to-be-detected image.

In some embodiments, the position information of each pixel point relative to the bounding box of the character including the pixel point when the pixel point is the character pixel point includes: offsets of coordinates of each pixel point relative to coordinates of two vertexes on a diagonal line of a rectangular bounding box of the character including the pixel point when the pixel point is the character pixel point.

In some embodiments, the positioning unit 703 may be configured for determining position information of bounding boxes of candidate characters based on the probability of each pixel point being the character pixel point, and the position information of each pixel point relative to the bounding box of the character including the pixel point when the pixel point is the character pixel point by: determining pixel points having the probability higher than a preset probability threshold being character pixel points; determining, based on the offsets of the coordinates of the determined character pixel points relative to the coordinates of the two vertexes on the diagonal line of the rectangular bounding box of the character including the character pixel points, coordinates of the bounding boxes of the characters positioned by the character pixel points; and filtering out coordinates of a bounding box of a repeatedly positioned character from the coordinates of the bounding boxes of the characters positioned by the character pixel points using a non-maximal value suppression method, to obtain coordinates of the bounding boxes of the candidate characters.

In some embodiments, the connecting unit 705 may be configured for determining a neighboring candidate character of each candidate character in the to-be-detected image based on the position information of the bounding boxes of the candidate characters by: classifying the candidate characters using a k-nearest neighbors algorithm based on the position information of the bounding boxes of the candidate characters, and determining the neighboring candidate character of each candidate character based on a classification result; and the connecting unit 705 may be configured for connecting the candidate character with the associated neighboring candidate character to form a character set by: calculating Euclidean distances between the character vector of the candidate character and the character vectors of the corresponding neighboring candidate characters for use as the degree of difference between the candidate character and the corresponding neighboring candidate characters; and using neighboring candidate characters having the degree of difference between the candidate character and the neighboring candidate characters smaller than a preset difference degree threshold as neighboring candidate characters associated with the candidate character, and connecting each candidate character with the associated neighboring candidate characters to form the character set.

In some embodiments, the determining unit 706 may be configured for determining the character area of the to-be-detected image by: drawing a surrounding line surrounding all characters in the character set to form the character area of the to-be-detected image based on the position information of the bounding boxes of the candidate characters in the character set.

In some embodiments, the apparatus 700 may further include: a training unit for training the text detection model using a machine learning method based on a sample image.

In some embodiments, the training unit may be further used for training the text detection model by: acquiring the sample image having characters marked with bounding boxes; inputting the sample image into the text detection model to predict a character area in the sample image, and to obtain a prediction result on whether a pixel point in the sample image is a character pixel point, a prediction result on position information of a bounding box of a character including the character pixel point in the sample image, and a prediction result on a character set in the sample image; calculating a value of a preset loss function, calculating a gradient of each parameter in the text detection model relative to the preset loss function, and updating the parameter of the model using a back propagation algorithm, until the value of the preset loss function meets a preset convergence condition.

The preset loss function includes a classification loss function, a bounding box regression loss function, and a character connecting loss function. The value of the classification loss function is used for characterizing a difference between a prediction result of the character detection network on whether the pixel point in the sample image is the character pixel point and a marked result on whether the pixel point in the sample image is the character pixel point; the value of the bounding box regression loss function is used for characterizing a difference between a prediction result of the character detection network on the position information of the bounding box of the character including the character pixel point in the sample image and the marked result on the position information of the bounding box of the character including the corresponding character pixel point in the sample image; and the value of the character connecting loss function is used for characterizing a consistency degree of degrees of differences between a prediction result of the text detection model on the character set in the sample image and character vectors of the candidate characters in the predicted character set.

The units disclosed in the apparatus 700 correspond to the steps in the method described in FIG. 2 and FIG. 6. Therefore, the operations and features described hereinbefore for the method are also applicable to the apparatus 700 and the units included therein, and are not repeated any more here.

In the apparatus 700 for detecting text according to the above embodiments of the disclosure, an extraction unit extracts features of a to-be-detected image in a plurality of abstract levels using a feature extraction network of a text detection model, then a detection unit predicts a probability of each pixel point in the to-be-detected image being a character pixel point, and position information of each pixel point relative to a bounding box of a character including the pixel point when the pixel point is the character pixel point using a character detection network of the text detection model based on the extracted features of the to-be-detected image; then a positioning unit determines position information of bounding boxes of candidate characters based on the probability of each pixel point being the character pixel point, and the position information of each pixel point relative to the bounding box of the character including the pixel point when the pixel point is the character pixel point; then a mapping unit inputs the extracted features of the to-be-detected image into a character mapping network of the text detection model, converts a feature map outputted by the character mapping network based on the position information of the bounding boxes of the candidate characters, and generates character vectors characterizing features of candidate characters; then a connecting unit determines a neighboring candidate character of each candidate character in the to-be-detected image based on the position information of the bounding boxes of candidate characters, and connects each candidate character with the associated neighboring candidate character to form a character set based on a degree of difference between each candidate character and the corresponding neighboring candidate character calculated using the character vector; and a determining unit finally determines a character area of the to-be-detected image based on the position information of the bounding boxes of the candidate characters in the character set, thereby achieving detecting text in a universal scenario, and improving the accuracy in detecting irregular characters.

Figure 8:
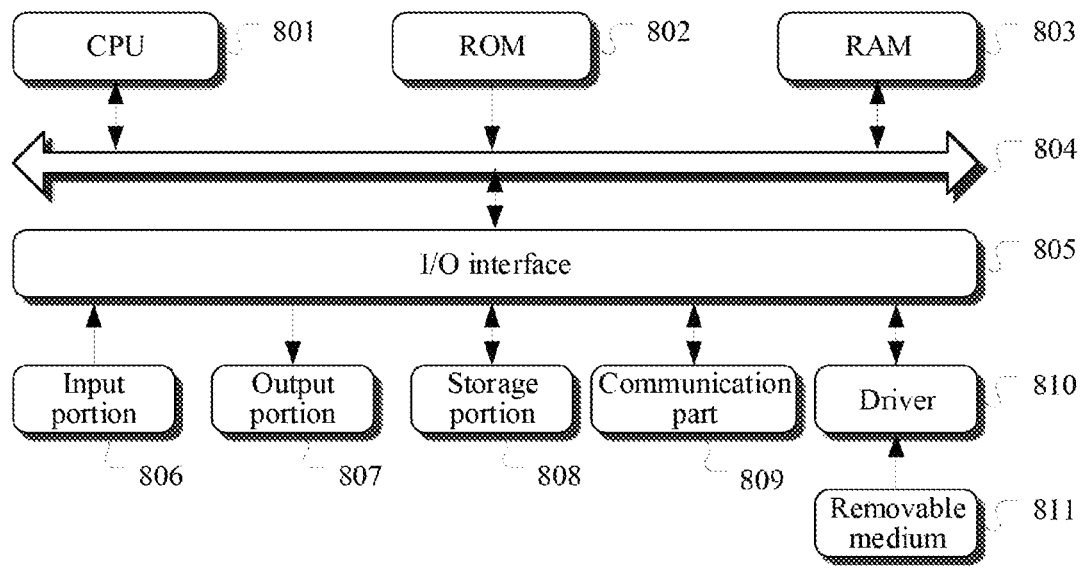
FIG. 8 is a schematic structural diagram of a computer system adapted to implement a server according to an embodiment of the disclosure.

Referring to FIG. 8, a schematic structural diagram of a computer system 800 adapted to implement a computer system of the embodiments of the present disclosure is shown. The electronic device shown in FIG. 8 is only an example, and should not limit a function and scope of the embodiment of the disclosure.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 including a cathode ray tube (CRT), a liquid crystal display device (LCD), a speaker etc.; a storage portion 808 including a hard disk and the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 809, and/or may be installed from the removable media 811. The computer program, when executed by the central processing unit (CPU) 801, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an extraction unit, a detection unit, a positioning unit, a mapping unit, a connecting unit and a determining unit, where the names of these units do not in some cases constitute a limitation to such units themselves. For example, the extraction unit may also be described as "a unit for extracting features of a to-be-detected image in a plurality of abstract levels using a feature extraction network of a text detection model."

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: extracting features of a to-be-detected image in a plurality of abstract levels using a feature extraction network of a text detection model; predicting, using a character detection network of the text detection mode based on the extracted features of the to-be-detected image, a probability of each pixel point in the to-be-detected image being a character pixel point, and position information of each pixel point relative to a bounding box of a character including the pixel point when the pixel point is the character pixel point; determining position information of bounding boxes of candidate characters, based on the probability of each pixel point being the character pixel point and the position information of each pixel point relative to the bounding box of the character including the pixel point when the pixel point is the character pixel point; inputting the extracted features of the to-be-detected image into a character mapping network of the text detection model, converting a feature map outputted by the character mapping network based on the position information of the bounding boxes of the candidate characters, and generating character vectors characterizing features of the candidate characters; determining a neighboring candidate character of each candidate character in the to-be-detected image based on the position information of the bounding boxes of the candidate characters, and connecting each candidate character with an associated neighboring candidate character to form a character set based on a degree of difference between the each candidate character and the neighboring candidate character, the degree of difference being calculated using the character vectors; and determining a character area of the to-be-detected image based on the position information of the bounding boxes of the candidate characters in the character set.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for detecting text, the method comprising:
    extracting features of a to-be-detected image in a plurality of abstract levels using a feature extraction network of a text detection model;
    predicting, using a character detection network of the text detection mode based on the extracted features of the to-be-detected image, a probability of each pixel point in the to-be-detected image being a character pixel point, and position information of the each pixel point relative to a bounding box of a character including the each pixel point when the each pixel point is the character pixel point;
    determining position information of bounding boxes of candidate characters, based on the probability of the each pixel point being the character pixel point and the position information of the each pixel point relative to the bounding box of the character including the each pixel point when the each pixel point is the character pixel point;
    inputting the extracted features of the to-be-detected image into a character mapping network of the text detection model, converting a feature map outputted by the character mapping network based on the position information of the bounding boxes of the candidate characters, and generating character vectors characterizing features of the candidate characters;
    determining a neighboring candidate character of each candidate character in the to-be-detected image based on the position information of the bounding boxes of the candidate characters, and connecting the each candidate character with an associated neighboring candidate character to form a character set based on a degree of difference between the each candidate character and the neighboring candidate character, the degree of difference being calculated using the character vectors; and
    determining a character area of the to-be-detected image based on the position information of the bounding boxes of the candidate characters in the character set.

2. The method according to claim 1, wherein the extracting features of a to-be-detected image in a plurality of abstract levels using a feature extraction network of a text detection model comprises:
    inputting the to-be-detected image into the feature extraction network to extract outputs from a plurality of different convolutional layers of the feature extraction network, and using the outputs as features in the plurality of abstract levels; and
    splicing the features in the plurality of abstract levels, or processing the features in the plurality of abstract levels using a feature pyramid network, to generate the features of the to-be-detected image.

3. The method according to claim 1, wherein the position information of the each pixel point relative to the bounding box of the character including the each pixel point when the each pixel point is the character pixel point comprises: offsets of coordinates of the each pixel point relative to coordinates of two vertexes on a diagonal line of a rectangular bounding box of the character including the each pixel point when the each pixel point is the character pixel point.

4. The method according to claim 3, wherein the determining position information of bounding boxes of candidate characters based on the probability of the each pixel point being the character pixel point, and the position information of the each pixel point relative to the bounding box of the character including the each pixel point when the each pixel point is the character pixel point comprises:
determining pixel points having the probability greater than a preset probability threshold as character pixel points;
determining, based on the offsets of the coordinates of each of the determined character pixel points relative to the coordinates of the two vertexes on the diagonal line of the rectangular bounding box of the character including the each character pixel point, coordinates of bounding boxes of characters positioned by the character pixel points; and
filtering out coordinates of a bounding box of a repeatedly positioned character from the coordinates of the bounding boxes of the characters positioned by the character pixel points using a non-maximal value suppression method, to obtain coordinates of the bounding boxes of the candidate characters.

5. The method according to claim 1, wherein the determining a neighboring candidate character of each candidate character in the to-be-detected image based on the position information of the bounding box of the each candidate character comprises:
classifying the candidate characters using a k-nearest neighbors algorithm based on the position information of the bounding boxes of the candidate characters, and determining the neighboring candidate character of the each candidate character based on a classification result; and
the connecting the each candidate character with the associated neighboring candidate character to form a character set based on a degree of difference between the each candidate character and the neighboring candidate character calculated using the character vector comprises:
calculating a Euclidean distance between a character vector of the each candidate character and a character vector of each of the neighboring candidate character, and using the Euclidean distance as the degree of difference between the each candidate character and the each neighboring candidate character; and
using a neighboring candidate character having the degree of the difference smaller than a preset difference degree threshold as a neighboring candidate character associated with the each candidate character, and connecting the each candidate character with the associated neighboring candidate character to form the character set.

6. The method according to claim 1, wherein the determining a character area of the to-be-detected image based on the position information of the bounding box of the each candidate character in the character set comprises:
drawing a surrounding line surrounding all characters in the character set to form the character area of the to-be-detected image based on the position information of the bounding boxes of the candidate characters in the character set.

7. The method according to claim 1, further comprising:
training the text detection model using a machine learning method based on a sample image.

8. The method according to claim 7, wherein the training the text detection model using a machine learning method based on a sample image comprises:
acquiring the sample image including characters marked with bounding boxes;
inputting the sample image into the text detection model to predict a character area in the sample image, and to obtain a prediction result on whether a pixel point in the sample image is a character pixel point, a prediction result on position information of a bounding box of a character including the character pixel point in the sample image, and a prediction result on a character set in the sample image; and
calculating a value of a preset loss function, calculating a gradient of each parameter in the text detection model relative to the preset loss function, and updating the each parameter of the model using a back propagation algorithm, until the value of the preset loss function meets a preset convergence condition,
wherein the preset loss function comprises a classification loss function, a bounding box regression loss function, and a character connecting loss function;
wherein the value of the classification loss function is used for characterizing a difference between a prediction result of the character detection network on whether the pixel point in the sample image is the character pixel point and a marked result on whether the pixel point in the sample image is the character pixel point;
the value of the bounding box regression loss function is used for characterizing a difference between a prediction result of the character detection network on the position information of the bounding box of the character including the character pixel point in the sample image and a marked result on the position information of the bounding box of the character including the character pixel point in the sample image; and
the value of the character connecting loss function is used for characterizing a consistency degree of a degree of difference between a prediction result of the text detection model on the character set in the sample image and a character vector of a candidate character in the predicted character set.

9. An apparatus for detecting text, comprising:
at least one processor; and
a memory storing instructions, wherein the instructions, when executed by the at least one processor, cause the at least one processor to perform operations, the operations comprising:
extracting features of a to-be-detected image in a plurality of abstract levels using a feature extraction network of a text detection model;
predicting, using a character detection network of the text detection mode based on the extracted features of the to-be-detected image, a probability of each pixel point in the to-be-detected image being a character pixel point, and position information of the each pixel point relative to a bounding box of a character including the pixel point when the each pixel point is the character pixel point;

determining position information of bounding boxes of candidate characters, based on the probability of the each pixel point being the character pixel point and the position information of the each pixel point relative to the bounding box of character including the each pixel point when the each pixel point is the character pixel point;

inputting the extracted features of the to-be-detected image into a character mapping network of the text detection model, converting a feature map outputted by the character map network based on the position information of the bounding boxes of the candidate characters, and generating character vectors characterizing features of the candidate characters;

determining a neighboring candidate character of each candidate character in the to-be-detected image based on the position information of the bounding boxes of the candidate characters, and connecting the each candidate character with an associated neighboring candidate character to form a character set based on a degree of difference between the each candidate character and the neighboring candidate character, the degree of different being calculated using the character vector; and determining a character area of the to-be-detected image based on the position information of the bounding boxes of the candidate characters in the character set.

10. The apparatus according to claim 9, wherein the extracting features of a to-be-detected image in a plurality of abstract levels using a feature extraction network of a text detection model comprises:

inputting the to-be-detected image into the feature extraction network to extract outputs from a plurality of different convolutional layers of the feature extraction network, and using the outputs as features in the plurality of abstract levels; and splicing the features in the plurality of abstract levels, or processing the features in the plurality of abstract levels using a feature pyramid network, to generate the features of the to-be-detected image.

11. The apparatus according to claim 9, wherein the position information of the each pixel point relative to the bounding box of the character including the each pixel point when the each pixel point is the character pixel point comprises: offsets of coordinates of the each pixel point relative to coordinates of two vertexes on a diagonal line of a rectangular bounding box of the character including the each pixel point when the each pixel point is the character pixel point.

12. The apparatus according to claim 11, wherein the determining position information of bounding boxes of candidate characters based on the probability of the each pixel point being the character pixel point, and the position information of the each pixel point relative to the bounding box of the character including the each pixel point when the each pixel point is the character pixel point comprises:

determining pixel points having the probability greater than a preset probability threshold as character pixel points;

determining, based on the offsets of the coordinates of each of the determined character pixel points relative to the coordinates of the two vertexes on the diagonal line of the rectangular bounding box of the character including the each pixel point, coordinates of bounding boxes of characters positioned by the character pixel points; and filtering out coordinates of a bounding box of a repeatedly positioned character from the coordinates of the bounding boxes of the characters positioned by the character pixel points using a non-maximal value suppression method, to obtain coordinates of the bounding boxes of the candidate characters.

13. The apparatus according to claim 9, wherein the determining a neighboring candidate character of each candidate character in the to-be-detected image based on the position information of the bounding box of the each candidate character comprises:

classifying the candidate characters using a k-nearest neighbors algorithm based on the position information of the bounding boxes of the candidate characters, and determining the neighboring candidate character of the each candidate character based on a classification result; and the connecting unit is used for connecting the each candidate character with the associated neighboring candidate characters to form a character set by following:

calculating a Euclidean distance between a character vector of the each candidate character and a character vector of each of the neighboring candidate character, and using the Euclidean distance as the degree of the difference between the each candidate character and the each neighboring candidate character; and using a neighboring candidate character having the degree of difference smaller than a preset difference degree threshold as a neighboring candidate character associated with the each candidate character, and connecting the each candidate character with the associated neighboring candidate character to form the character set.

14. The apparatus according to claim 9, wherein the determining a character area of the to-be-detected image based on the position information of the bounding box of the each candidate character in the character set comprises:

drawing a surrounding line surrounding all characters in the character set to form the character area of the to-be-detected image based on the position information of the bounding boxes of the candidate characters in the character set.

15. The apparatus according to claim 9, wherein the operations further comprise:

training the text detection model using a machine learning method based on a sample image.

16. The apparatus according to claim 15, wherein the training the text detection model using a machine learning method based on a sample image comprises:

acquiring the sample image including characters marked with bounding boxes;

inputting the sample image into the text detection model to predict a character area in the sample image, and to obtain a prediction result on whether a pixel point in the sample image is a character pixel point, a prediction result on position information of a bounding box of a character including the character pixel point in the sample image, and a prediction result on a character set in the sample image; and calculating a value of a preset loss function, calculating a gradient of each parameter in the text detection model relative to the preset loss function, and updating the each parameter of the model using a back propagation algorithm, until the value of the preset loss function meets a preset convergence condition, wherein the preset loss function comprises a classification loss function, a bounding box regression loss function, and a character connecting loss function;

wherein the value of the classification loss function is used for characterizing a difference between a prediction result of the character detection network on whether the pixel point in the sample image is the character pixel point and a marked result on whether the pixel point in the sample image is the character pixel point;

the value of the bounding box regression loss function is used for characterizing a difference between a prediction result of the character detection network on the position information of the bounding box of the character including the character pixel point in the sample image and a marked result on the position information of the bounding box of the character including the character pixel point in the sample image; and the value of the character connecting loss function is used for characterizing a consistency degree of a degree of difference between a prediction result of the text detection model on the character set in the sample image and a character vector of a candidate character in the predicted character set.

17. A non-transitory computer storage medium, storing a computer program therein, the program, when executed by a processor, causes the processor to perform operations, the operations comprising extracting features of a to-be-detected image in a plurality of abstract levels using a feature extraction network of a text detection model;

predicting, using a character detection network of the text detection mode based on the extracted features of the to-be-detected image, a probability of each pixel point in the to-be-detected image being a character pixel point, and position information of the each pixel point relative to a bounding box of a character including the each pixel point when the each pixel point is the character pixel point;

determining position information of bounding boxes of candidate characters, based on the probability of the each pixel point being the character pixel point and the position information of the each pixel point relative to the bounding box of the character including the each pixel point when the each pixel point is the character pixel point;

inputting the extracted features of the to-be-detected image into a character mapping network of the text detection model, converting a feature map outputted by the character mapping network based on the position information of the bounding boxes of the candidate characters, and generating character vectors characterizing features of the candidate characters;

determining a neighboring candidate character of each candidate character in the to-be-detected image based on the position information of the bounding boxes of the candidate characters, and connecting the each candidate character with an associated neighboring candidate character to form a character set based on a degree of difference between the each candidate character and the neighboring candidate character, the degree of difference being calculated using the character vectors; and determining a character area of the to-be-detected image based on the position information of the bounding boxes of the candidate characters in the character set.

\* \* \* \* \*